United States Patent
Kozica et al.

(10) Patent No.: US 10,291,917 B2
(45) Date of Patent: *May 14, 2019

(54) INDEPENDENT TEMPORALLY CONCURRENT VIDEO STREAM CODING

(71) Applicant: Google LLC, Mountain View, CA (US)

(72) Inventors: Ermin Kozica, Nacka (SE); Dave Zachariah, Jarfalla (SE); Willem Bastiaan Kleijn, Stocksund (NL)

(73) Assignee: Google LLC, Mountain View, CA (US)

( * ) Notice: Subject to any disclaimer, the term of this patent is extended or adjusted under 35 U.S.C. 154(b) by 757 days.

This patent is subject to a terminal disclaimer.

(21) Appl. No.: 14/834,624

(22) Filed: Aug. 25, 2015

(65) Prior Publication Data
US 2016/0065967 A1 Mar. 3, 2016

Related U.S. Application Data

(63) Continuation of application No. 14/077,304, filed on Nov. 12, 2013, now Pat. No. 9,137,561, which is a
(Continued)

(51) Int. Cl.
*H04N 19/136* (2014.01)
*H04N 19/172* (2014.01)
(Continued)

(52) U.S. Cl.
CPC .......... *H04N 19/136* (2014.11); *H04N 19/12* (2014.11); *H04N 19/172* (2014.11); *H04N 19/44* (2014.11);
(Continued)

(58) Field of Classification Search
None
See application file for complete search history.

(56) References Cited

U.S. PATENT DOCUMENTS 6,357,045 B1 * 3/2002 Devaney ............... H04N 7/52
   348/385.1
6,965,643 B1 11/2005 Maeda et al.
(Continued)

FOREIGN PATENT DOCUMENTS

| | | |
|---|---|---|
| DE | 19531847 | 3/1997 |
| EP | 1578131 | 9/2005 |
| EP | 1615441 | 1/2006 |
| EP | 1638344 | 3/2006 |

*Primary Examiner* — Hong S Cho
(74) *Attorney, Agent, or Firm* — Honigman Miller Schwartz and Cohn LLP

(57) ABSTRACT

Implementations of independent temporally concurrent video stream coding may include encoding a plurality of input frames from an input video sequence, wherein the plurality of input frames includes a first input frame. Encoding the plurality of input frames may include generating a first plurality of encoded frames based on the plurality of input frames such that the first plurality of encoded frames includes a first encoded I-frame corresponding to the first input frame, and generating a second plurality of encoded frames based on the plurality of input frames such that the second plurality of encoded frames includes a first encoded P-frame corresponding to the first input frame. Implementations of independent temporally concurrent video stream coding may include including the first plurality of encoded frames and the second plurality of encoded frames in an output, and transmitting the output to a decoder.

15 Claims, 2 Drawing Sheets

Related U.S. Application Data continuation of application No. 13/281,087, filed on Oct. 25, 2011, now Pat. No. 8,582,662, which is a continuation of application No. 12/068,025, filed on Jan. 31, 2008, now Pat. No. 8,073,049.

(60) Provisional application No. 60/898,718, filed on Feb. 1, 2007.

(51) Int. Cl.
| | | |
|---|---|---|
| *H04N 19/44* | (2014.01) | |
| *H04N 21/43* | (2011.01) | |
| *H04N 21/262* | (2011.01) | |
| *H04N 21/2343* | (2011.01) | |
| *H04N 19/46* | (2014.01) | |
| *H04N 19/61* | (2014.01) | |
| *H04N 19/12* | (2014.01) | |

(52) U.S. Cl.
CPC ............ *H04N 19/46* (2014.11); *H04N 19/61* (2014.11); *H04N 21/23439* (2013.01); *H04N 21/26275* (2013.01); *H04N 21/4305* (2013.01)

(56) References Cited

U.S. PATENT DOCUMENTS

| | | |
|---|---|---|
| 7,263,125 B2 | 8/2007 | Lainema |
| 2003/0007515 A1 | 1/2003 | Apostolopoulos et al. |
| 2003/0012275 A1 | 1/2003 | Boice et al. |
| 2003/0012278 A1* | 1/2003 | Banerji ................... H04N 19/46 375/240.12 |
| 2003/0031251 A1* | 2/2003 | Koto .................... H04N 19/159 375/240.03 |
| 2003/0039308 A1 | 2/2003 | Wu et al. |
| 2003/0067938 A1 | 4/2003 | Schmidt |
| 2004/0120358 A1 | 6/2004 | Unger |
| 2004/0213345 A1 | 10/2004 | Holcomb et al. |
| 2005/0207497 A1 | 9/2005 | Rovati et al. |
| 2006/0114995 A1* | 6/2006 | Robey ................... H04N 19/61 375/240.12 |
| 2006/0126733 A1 | 6/2006 | Boyce et al. |
| 2006/0245735 A1* | 11/2006 | Kanda ................... H04N 5/772 386/224 |
| 2007/0047650 A1 | 3/2007 | Vilei et al. |
| 2007/0092004 A1 | 4/2007 | Ho |
| 2008/0267290 A1 | 10/2008 | Barbieri et al. |

\* cited by examiner

INDEPENDENT TEMPORALLY CONCURRENT VIDEO STREAM CODING

CROSS-REFERENCE TO RELATED APPLICATIONS

This application is a continuation of U.S. patent application Ser. No. 14/077,304 filed on Nov. 12, 2013, which is a continuation of U.S. patent application Ser. No. 13/281,087 filed on Oct. 25, 2011, now U.S. Pat. No. 8,582,662, which is a continuation of U.S. patent application Ser. No. 12/068,025 fled on Jan. 31, 2008, now U.S. Pat. No. 8,073,049, which claims priority to U.S. Provisional Patent Application No. 60/898,718, filed Feb. 1, 2007, each of which are incorporated herein by reference in their entireties.

TECHNICAL FIELD OF THE INVENTION

The present invention relates to a method and apparatus for encoding of a video sequence.

BACKGROUND OF THE INVENTION

A video sequence consists of a number of still images called frames. Coding of a video sequence, video coding, is done by describing the frames as bit-efficiently as possible. To do this, redundancy in the video sequence is exploited. There are three types of redundancies that can be exploited, temporal redundancy, spatial redundancy and spectral redundancy. Temporal redundancy is the redundancy between two frames, while spatial redundancy is the redundancy within a frame. Spectral redundancy is the redundancy between different colour components in the video. In the following we will not consider the spectral redundancy.

Video coding standards define a number of frame types, out of which the I-frame and the P-frame are common to most standards. The I-frame is coded by exploiting spatial redundancy solely, resulting in a representation that is independent of all other frames. P-frames, on the other hand, are coded by exploiting both temporal and spatial redundancies. This leads to a more compact representation of the frame, while at the same time making this representation dependent of an other frame (in most cases the previous one).

Video coding standards from about 1995, e.g., H.263 and later MPEG-2, have been developed for the purpose of bit-efficient video coding and make use of the I-frame/P-frame setup. The applications have mainly included video-conferencing and videotelephony over circuit-switched networks, but also storing video material for later retrieval, e.g., the DVD. Newer standards, e.g., MPEG-4 and H.264, have a performance that is significantly improved over their predecessors and achieve low bit-rates for given video quality. The main ideas of using different frame types have been preserved and the performance improvement is a result of refinement of the methods used in older standards. One such refinement is that a frame can be segmented into smaller regions called slices, and the method of using I frames and P frames can be applied on individual slices.

With the arrival of new technology, where greater processing power and packet-switched networks (WLAN and Internet) have had the leading role, new applications have become of interest. These applications include streaming video and live video communication over IP networks. The requirements that live video communication applications pose on the underlying technique are quite different from those of storage applications and even streaming applications. In addition to the requirements that are present in storage and streaming applications, live video communication poses a strict requirement on the delay between sending and displaying video. This strict requirement makes the overall number of errors in transmission increase, since delayed packets are handled equivalently to lost packets.

Existing video coding techniques, using the mentioned setup with different frame types, are not suitable for live video communication due to the strict delay restriction. Introducing high dependency between frames to achieve a bit-efficient representation of the signal results in display of erroneous video in environments where the probability of transmission error is significant. Not only is it impossible to render frames that are not received in time, but the frame dependency makes the error propagate throughout the video sequence, which is annoying to the viewer. The problem is in current standards handled, in more or less efficient ways, by sending a frame that is independent of other frames, an I-frame. In this manner, the propagated error is reset to zero. However, the choice of how frequently I-frames should be sent is not trivial. Increasing the I frame frequency results in better video quality when there is a possibility of transmission errors, while at the same time increasing the bit-rate. Hence, there is a trade-off between video quality and bit-efficient representation of the video.

Therefore, it is desirable to be able to increase the video quality without having to increase the bit-rate too much, thereby still providing a bit-efficient representation of the video.

SUMMARY OF THE INVENTION

An object of the present invention is to provide encoding and decoding of a video sequence which improves the perceptual video quality with only a moderate increase of the bit-rate for transferring the encoded video sequence.

A method and an apparatus for encoding a video sequence, and a method and an apparatus for decoding a video sequence, in accordance with the present invention are defined in the appended independent claims.

The invention is based on the idea of using two or more coding units for encoding two or more descriptions of the same video sequence, wherein the encoding units perform their encoding operations displaced in time in relation to each other. The invention also includes the use of two or more decoding units for decoding two or more descriptions of the same video sequence, wherein the decoding units perform their decoding operations displaced in time in relation to each other.

The use of more than one encoder for encoding the same video sequence has the advantage of increasing the possibility that one or more encoded descriptions of a video sequence frame are received without error, even though one or more encoded descriptions of the same frame are non-existent due to an error or delay when transferring the encoded video sequence over a network from a transmitting end to a receiving end. By displacing the encoding operations of the encoders in time, the probability that the received encoded sequences include propagated errors at the same time will be reduced. This is because the different encoded sequences will have some kind of zero states occurring at different points in time. With increased time since the last zero state for an encoded sequence, the higher probability of a propagated error for that encoded sequence. By displacing the zero states for the different encoded sequences, there will always be a lower probability of a propagated error for one or more of the sequences than for the other(s). In comparison, with no displacement of the zero states for the encoded sequences, all encoded sequences will simultaneously increase their probability of including a propagated error up to the point when, at the same time for all sequences, new encoded zero states occur.

Another advantage of displacing the encoding operations of the encoders in time is achieved in case of a disruption in the network transferring all the encoded video sequences and effecting all the sequences at the same time. In such case, the time until one of the video sequences includes a zero state after the disruption will in most cases be smaller, as compared to the case with no displacement of the zero state. In the latter case, since the zero states for the multiple encoded sequences occur simultaneously, the time to the next zero state for all the multiple encoded sequences will be the same as in the case when only one single encoded sequence is used for transferring the video.

It will be appreciated that transfer of two or more descriptions over a network may result in that the different descriptions are not received in synchronism due to varying network jitter for the different descriptions. As known by the skilled person, jitter buffers at the receiving end are used for dealing with network jitter. Thus, with multiple descriptions, multiple jitter buffers are needed. Frames of different descriptions may then be output in synchronism from the respective jitter buffers. Advantageously, the present inventions has jitter buffer arranged at the receiving end, preferrably one jitter buffer for each description received, and, thus, for each decoder. Thus, using jitter buffers, the decoders will be provided with data to be decoded from respective jitter buffers. According to the invention, the decoding operations of one decoder are then displaced in time with regard to decoding operations of another decoder.

Typically, a zero state as discussed above corresponds to an intra-encoding operation, i.e. an encoding operation exploiting spatial redundancy only, and the encoding operations between two zero states of the same encoded video sequence correspond to inter-encoding operations, i.e. encoding operations exploiting temporal redundancy between successive points of time of encoding. Further, the intra-encoding and inter-encoding may be used on a frame-by-frame basis of the video sequence, or on a slice-by-slice basis, wherein a slice corresponds to a segment of a frame.

According to an embodiment of the invention, the intra-encoding and inter-encoding correspond to I type and P type encoding, respectively. Thus, the invention is applicable both for video coding standards in which the encoding uses I/P frames and video coding standards using I/P slices. Consequently, as the invention does not depend on whether successive full frames or successive slices of frames are encoded using the I/P concept, the following description will use the term I/P frame as general notation for both I/P frame and I/P slice. Thus, whenever I and P frames are discussed and described, the same description applies for I and P slices. Further, it will be appreciated that the inter-encoded frames/slices of the present invention can be implemented with different kinds of predictive frames/slices, e.g. B type (Bi-predictive encoding), and that the reference to P type encoding merely discloses an exemplifying embodiment.

Thus, it will be appreciated that the present invention provides video sequence encoding using two or more encoders such that shorter error propagation on an average is provided, which results in perceptually improved quality of the displayed video at a receiving end after decoding of the video sequences. In addition, it will be appreciated that displacing the encoding operations for different encoders in time does not increase the bit-rate for transferring the different encoded video sequences, as compared to transferring the same number of encoded video sequences without any displacement of the encoding operations. Thus, the present invention improves the video quality by ensuring robustness against transmission errors.

It will also be appreciated that the discussion above, and the following description, of encoding operations in accordance with the invention, apply correspondingly to decoding operations as defined by the invention.

Further features of the invention, as well as advantages thereof, will become more readily apparent from the following detailed description of a number of exemplifying embodiments of the invention. As is understood, various modifications, alterations and different combinations of features coming within the scope of the invention as defined by the appended claims will become apparent to those skilled in the art when studying the general teaching set forth herein and the following detailed description.

BRIEF DESCRIPTION OF THE DRAWINGS

Exemplifying embodiments of the present invention will now be described with reference to the accompanying drawings, in which.

DETAILED DESCRIPTION OF THE INVENTION

Figures 1, 2:
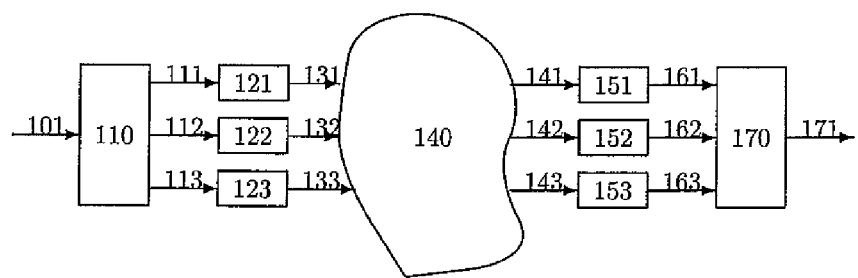
FIG. 1 schematically shows an exemplifying overall system environment in which various embodiments of the invention may be included and arranged to operate.
FIG. 2 schematically shows how to obtain several different descriptions of a video frame (or slice of a video frame) for encoding of each of the description by a separate encoder.

FIG. 1 schematically shows an exemplifying overall system environment in which the different embodiments of the invention may be included and arranged to operate.

In FIG. 1 a digitized video signal 101, divided into frames, is input, each frame representing a still image in time.

In general, to obtain robustness to transmission errors, a video signal can be divided into multiple descriptions. Each description is then encoded in a separate coding unit which is an implementation of an existing standard coder. This implies that there are I-frames and P-frames for each description. In case all descriptions are received at the receiver end, the best quality of video is obtained. In case there are errors in the transmission, affecting a number of descriptions, these descriptions are disregarded until they have been updated by an I-frame. Of course, this has the effect that the quality of the video is reduced temporarily.

The descriptions in a multiple description video encoding setup can relate to each other in a number of ways. First of all, they can be either equivalent or non-equivalent, i.e., each description results in the same quality or a differing quality compared to another description. Whether the descriptions are equivalent or not, they can (i) be fully redundant, i.e., several descriptions are replications of one another, (ii) have zero redundancy, i.e., the descriptions have no mutual information and (iii) be redundant to some extent, i.e. there is some mutual information between the descriptions. How the descriptions relate can affect the overall performance on different networks.

One important property of coders using the multiple description coding setup which makes improvement of the performance possible is the following. When sending multiple descriptions of a video signal, where the descriptions are coded in separate coding units, there is the possibility of utilizing the fact that the coding units of each description are independent. That is, the coding procedure of description one does not depend on the coding procedure of description two. The present invention provides simple and yet effective techniques for utilizing this property of the coding setup.

Referring to FIG. 1, the transmitting end includes three encoders 121, 122 and 123. These three encoders are preferably standard encoders operating in accordance with the H.263, MPEG-2, H.264, or MPEG-4 video coding standards. To each encoder 121, 122, 123 a respective description 111, 112, 113 of the video signal is input. The three encoders all handle their respective description in a similar manner, i.e. encode the received description using I-frames and P-frames (or when applicable, I-slices and P-slices) in accordance with the video coding standard used. The difference between the three encoders themselves is the time during which they perform intra-encoding operations. Thus, the sequence of output I-frames and P-frames differ between the three encoders. The receiving end includes three decoders 151, 152 and 153, also preferably being standard encoders operating in accordance with the H.263, MPEG-2, H.264, or MPEG-4 video coding standards. Each decoder 151, 152, 153 decodes a respective description 111, 112, 113 of the video signal. The three decoders all handle their respective description in a similar manner, i.e. decode the received encoded description consisting of I-frames and P-frames (or when applicable, I-slices and P-slices) in accordance with the video coding standard used. The difference between the three decoders themselves is the time during which they perform intra-decoding operations. Thus, the sequence of decoded I-frames and P-frames differ between the three encoders.

In accordance with one embodiment, the video signal 101 is input to a sub-sampling unit 110. The sub-sampling unit sub-samples (in time or space, i.e. performs temporal or spatial sub-sampling) the input video sequence signal 101 into multiple, differing descriptions 111, 112 and 113 of the video signal 101. The receiving end includes an up-sampling unit 170 that performs the inverse procedure of the sub-sampling procedure, i.e. rearranges the decoded descriptions, decoded by decoders 151, 152 and 153, into one set of successive video frames.

According to an alternative embodiment, the descriptions 111, 112 and 113 are identical, in which case the unit referenced as 110 is a replication unit replicating the input video signal 101 into three identical descriptions 111, 112 and 113. Consequently, in this alternative embodiment, the up-sampling unit 170 may simply be a unit responsible for discarding redundant decoded description (or for merging decoded descriptions if these are not fully redundant). That is, if two or more descriptions 161, 162, 163 are decoded by respective decoders 151, 152 and 153 at the receiving end without errors, and if the descriptions are fully redundant, all but one of the decoded descriptions may simply be discarded by the unit 170.

An exemplifying sub-sampling procedure is described with reference to FIG. 2. This exemplified sub-sampling procedure assigns pixels from the input video still images to the three descriptions 111, 112 and 113.

An input video image, or frame, 201 is here five pixels high and nine pixels wide. The pixels are assigned to descriptions column-wise: columns one, four and seven are assigned to description one, denoted 202, columns two, five and eight are assigned to description two, denoted 203, and columns three, six and nine are assigned to description three, denoted 204. Each pixel is named in the figure and can be located in its description.

The sub-sampling procedure of FIG. 2 is not the only one that can be used. There are other possible sub-sampling procedures, which also can be incorporated with the invention. Depending on the number of descriptions in the multiple description coding setup, so called quincunx sub-sampling, temporal sub-sampling and poly-phase sub-sampling can be used. In quincunx sub sampling, two descriptions are assigned the pixels in a checker-board fashion, the (odd-row, odd-column) pixels and the (even-row, even-column) pixels are assigned to one description, while the (odd-row, even-column) pixels and the (even-row, odd-column) pixels are assigned to the other description. In temporal sub-sampling the number of descriptions is arbitrary. For example, assigning every third frame starting from frame one to description one, every third frame starting from frame two to description two and every third frame starting from frame three to description three, which yields three descriptions. Poly-phase sub-sampling is performed by sub-sampling the original frame along rows (by factor R), producing R temporary descriptions. These R temporary descriptions are then sub-sampled (by factor C), each producing C descriptions and a total of R*C descriptions.

Referring again to FIG. 1, regardless of whether the three descriptions 111, 112 and 113 are identical (equivalent) or different (non-equivalent), each description is independently encoded by its respective encoder 121, 122 and 123. Typically, each encoder encodes its input description so as to output the encoded video description as a series of I frames and P frames.

Figure 3:
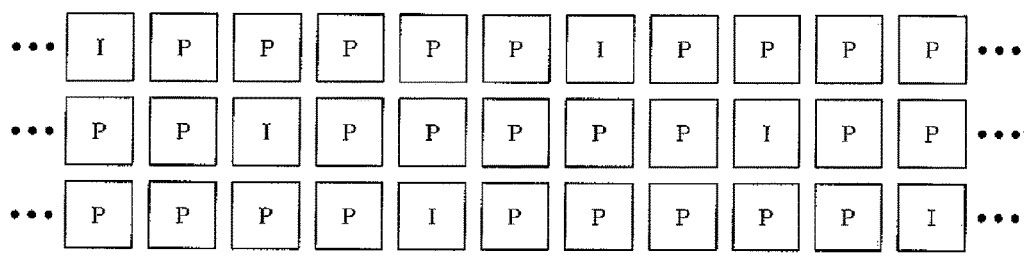
FIG. 3 shows an embodiment of the invention where intra-encoding operations of each encoded video sequence among three encoded video sequences are displaced in relation to the intra-encoding operations of the other encoded video sequences.

In the embodiment of FIG. 3 the intra-encoding operations applied to each video sequence description among three different video sequence descriptions are displaced in relation to the intra-encoding operations applied to the other video sequence descriptions. The independency of the corresponding three encoding units is exploited by displacing the I frames to be interlaced in time such that the temporal distance between two (in different encoded descriptions) following I-frames is always equal. The group of pictures (GOP) length for each encoded description is six frames, while the distance between two I-frames is two frames. However, one exception to the setup in FIG. 3 has to be made, namely, the first frame of each description is coded as an I-frame. This is done to get a good reference for prediction in all the encoded descriptions.

Correspondingly, at a receiver end, intra-decoding operations applied to each received video sequence description among three different video sequence descriptions are displaced in relation to the intra-decoding operations applied to the other video sequence descriptions. The displacement of the intra-decoding operations of two decoders corresponds to the temporal distance between two I-frames of respective encoded descriptions that are to be decoded.

Referring to FIG. 1, each coded description 131-133 is sent over the network 140. The network is such that some of the encoded description frames may be transferred with errors or be delayed, which in a packet switched network results in missing video data for the frames in question. This behaviour is typical of packet-switched networks. The encoded descriptions 141-143 that arrive at the receiving end are decoded in respective decoders 151-153. After decoding, the final result is obtained by up-sampling of the decoded descriptions 161-163 in up-sampling unit 170. As described above, the up-sampling procedure is the inverse of the sub-sampling procedure, i.e. the pixels are rearranged from the three descriptions into one final frame. The final result 171 is a digital representation of the video that was input at the receiving end and is sent for further processing, e.g., displaying on a monitor.

Some of the descriptions of a current frame may be lost, delayed or corrupted, resulting in a treatment as being non-existent. This will result in a propagated error in the decoded representation of the description. The propagated error is caused by the dependence of frames which causes all inter-coded frames following an erroneous frame to be erroneous.

In one possible embodiment, a non-existent or corrupted description is disregarded by up-sampling unit 170 and its pixels are instead estimated from the pixels of the other descriptions. This can be done in an interpolating manner, e.g., pixel $b_1$ in FIG. 2 is estimated as the mean of $a_1$ and $c_1$. A description is disregarded as long as it is corrupt. Hence, it will be taken in use only when an I-frame of that description arrives at the receiver end. Having access to as many non-corrupt descriptions as possible results in the best quality, why one wants to maximize the number of non-corrupt descriptions at all times. By placing the I frames as illustrated in FIG. 3, the expected number of descriptions available at any time will be greater than if the same frame would have been encoded as an I-frame for every description. This follows from the fact that the interval between I-frames is smaller and the probability of a propagated error will at any time be different for the three different descriptions.

In order to for the up-sampling unit 170 to be able to decide how to arrange the received descriptions, i.e. the output of the decoders, into one set of successive video frames, it needs to keep track of the validity of the received descriptions. This is preferably done by including output validity flags in the up-sampling unit, one output validity flag for each decoder connected to the up-sampling unit. A decoder's output validity flag indicates whether the description from that decoder is corrupted or non-corrupted, and, thus, whether that description should be used when arranging the received descriptions into one set of successive video frames. When a decoder determines a description to be lost, delayed or corrupted, it signals to the up-sampling unit that the corresponding output validity flag should be set to corrupted. When a decoder decodes an I frame, it signals to the up-sampling unit that the corresponding output validity flag should be set to non-corrupted. Thus, the up-sampling unit 170 will at every time instance be able keep track of the validity of each one of the descriptions received from the decoders. The above design of separate signalling for each decoder with regard to setting output validity as non-corrupted is due to the fact that the I frames of the different descriptions are displaced in time. In comparison, in a design in which the I frames of the different descriptions are not displaced in time, it is sufficient with a single signalling for all descriptions when the I frames are decoded.

By maximizing the number of descriptions that is available at any given time instance, the perceptual quality of the video is improved. Also, in the case that all descriptions are corrupted, the time until an update (zero state or I frame for any description) is received is minimized. It will be appreciated that the above described structure and operation made with reference to FIGS. 1-3 is applicable to any number of description of the video sequence. Thus, even though FIGS. 1-3 relates to three descriptions, the corresponding disclosure is applicable also with regard to two or four, or any greater number, of utilized descriptions.

Figure 4:
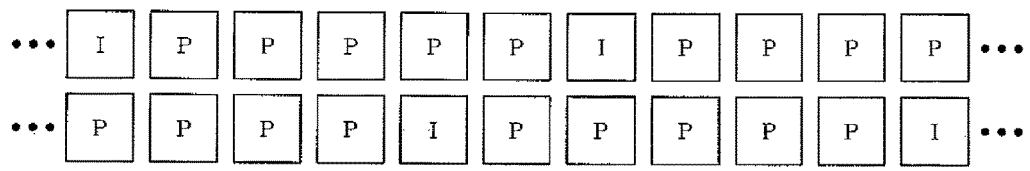
FIG. 4 shows an embodiment of the invention where intra-encoding operations of one encoded video sequence is displaced in relation to the intra-encoding operations of another encoded video sequences.

Referring to FIG. 4 another embodiment of the invention is described. The independence of the coding units is in this embodiment exploited by placing the I-frames in the multiple descriptions such that the expected distortion at the receiver end is minimized. The I frames of the different descriptions are placed based on calculations that utilize known transmission error probabilities, i.e. known network characteristics. FIG. 4 shows an example with two descriptions in which the probability of transmission error for the upper (in FIG. 4) description is assumed or known to be lower than the probability of transmission error for the lower (in FIG. 4) description. In this way the I-frames are interlaced such that the expected distortion at the receiver end is minimized. The sender can choose to use the information regarding different transmission error probabilities for the two transferred encoded descriptions to improve the performance, not only in comparison to placement of the I frames at the same time for both descriptions, but also in comparison to the placement of I frames described in the previous embodiment. The displacement of the decoding operations at the receiving end corresponds to the placement of the I-frames shown in FIG. 4.

With the assumption above that the probability of error for the upper description is lower than the probability of error for the lower description, then it is advantageous to move the relative placement of the I frames of the encoded descriptions in accordance with what is shown in FIG. 4. With such a placement of the I-frames, the lower probability of error in the upper encoded description is recognized. The lower description can be seen as complementary, i.e., it is used to decrease the probability of error when the upper description is no longer reliable. Since, the upper description has lower probability of error, the I frame of the lower description can be moved to the right (to occur later in time) and the upper description is trusted with a greater number of P frames before the lower description is used to decrease the overall probability of error. For example, with the time from left to right in FIG. 4, the first P frame after the I frame of the lower description occurs at the same time as the fifth P frame of the upper description, thereby providing a decreased overall probability of error. The situation for the lower description is the opposite.

The optimal placement of the I-frames for descriptions one and two can with given probabilities of error and expected distortion be calculated in a minimization problem. The expected value of the total distortion is minimized with respect to the relative placement of the I-frames. In brief, the expression for the expected distortion is shown to occur in periods, why it is sufficient to solve the minimization problem only for an interval between two I-frames in either description. Next, the expression for the expected distortion in this interval is differentiated with respect to the length of I-frame displacement, giving an extremum. Since, the problem now lies in an interval, the minimum is found by evaluating the expected distortion at the extremum and at the boundaries of the interval. This will be described further in the following.

Let us assume that the network is modelled by two independent Gilbert channel models A and B, where state 0 denotes error free transmission and state 1 denotes erroneous transmission. The following table defines the properties that are assumed to be known about the two Gilbert channels. Also, the expected average distortions for different channel realizations are defined.

| Variable | Meaning |
|---|---|
| $p_x$ | Probability that channel X is in state 1 if it previously was in state 0. |
| $q_x$ | Probability that channel X is in state 0 if it previously was in state 1. |
| $D_0$ | Distortion of the output video if both descriptions are received. |
| $D_x$ | Distortion of the output video if only description X is received. |
| $D_T$ | Distortion of the output video if no descriptions are received. |

Let us define the following variables to simplify notation.

$$\pi_A = \frac{q_A}{p_A + q_A}$$

$$\pi_B = \frac{q_B}{p_B + q_B}$$

$$r_A = 1 - p_A$$

$$r_B = 1 - p_B$$

The optimization problem is to minimize the expectation of distortion D over all frames $k \in \{-\kappa, \kappa\}$ for the discrete displacement variable $\Delta \in \{0, K-1\}$ where K denotes the I-frame period length.

$$\min_{\Delta \in \{0, K-1\}} E[D] = \min_{\Delta \in [0,K)} \frac{1}{2\kappa}$$

$$\sum_{k=-\kappa}^{\kappa} \left( D_0 \pi_A r_A^{\text{mod}\frac{k}{K}} \pi_B r_B^{\text{mod}\frac{k-\Delta}{K}} + D_A \pi_A r_A^{\text{mod}\frac{k}{K}} \left(1 - \pi_B r_B^{\text{mod}\frac{k-\Delta}{K}}\right) + D_B \pi_B \right.$$

$$\left. r_B^{\text{mod}\frac{k-\Delta}{K}} \left(1 - \pi_A r_A^{\text{mod}\frac{k}{K}}\right) + D_T \left(1 - \pi_A r_A^{\text{mod}\frac{k}{K}}\right)\left(1 - \pi_B r_B^{\text{mod}\frac{k-\Delta}{K}}\right)\right),$$

where $$\text{mod}\frac{a}{b}$$

denotes the modulo b division of a. Let us approximate that the distortion summation is represented by the following integral, in which the frame number $k \in \{-\kappa, \kappa\}$, and the displacement variable $\Delta \in [0, K)$ are continuous.

$$\min_{\Delta \in [0,K)} D =$$

$$\min_{\Delta \in [0,K)} \frac{1}{2\kappa} \int_{-\kappa}^{\kappa} \left( D_0 \pi_A r_A^{\text{mod}\frac{k}{K}} \pi_B r_B^{\text{mod}\frac{k-\Delta}{K}} + D_A \pi_A r_A^{\text{mod}\frac{k}{K}} \left(1 - \pi_B r_B^{\text{mod}\frac{k-\Delta}{K}}\right) + \right.$$

$$D_B \pi_B r_B^{\text{mod}\frac{k-\Delta}{K}} \left(1 - \pi_A r_A^{\text{mod}\frac{k}{K}}\right) +$$

$$\left. D_T \left(1 - \pi_A r_A^{\text{mod}\frac{k}{K}}\right)\left(1 - \pi_B r_B^{\text{mod}\frac{k-\Delta}{K}}\right)\right)dk =$$

$$\min_{\Delta \in [0,K)} \int_0^{\Delta} (D_0 \pi_A r_A^k \pi_B r_B^{K+k-\Delta} + D_A \pi_A r_A^k (1 - \pi_B r_B^{K+k-\Delta}) + D_B \pi_B$$

-continued $$r_B^{K+k-\Delta}(1 - \pi_A r_A^k) + D_T(1 - \pi_A r_A^k)(1 - \pi_B r_B^{K+k-\Delta}))dk +$$

$$\int_{\Delta}^{K} (D_0 \pi_A r_A^k \pi_B r_B^{k-\Delta} + D_A \pi_A r_A^k (1 - \pi_B r_B^{k-\Delta}) +$$

$$D_B \pi_B r_B^{k-\Delta}(1 - \pi_A r_A^k) + D_T(1 - \pi_A r_A^k)(1 - \pi_B r_B^{k-\Delta}))dk =$$

$$\min_{\Delta \in [0,K)} \int_0^K (\pi_A r_A^k (D_A - D_T) + D_T) dk +$$

$$\pi_B r_B^{K-\Delta} \int_0^{\Delta} (\pi_A (D_0 - D_A - D_B + D_T) r_A^k r_B^k + (D_B - D_T) r_B^k) dk +$$

$$\pi_B r_B^{-\Delta} \int_{\Delta}^{K} (\pi_A (D_0 - D_A - D_B + D_T) r_A^k r_B^k + (D_B - D_T) r_B^k) dk =$$

$$\min_{\Delta \in [0,K)} \int_0^K (\pi_A r_A^k (D_A - D_T) + D_T) dk +$$

$$\pi_B r_B^{K-\Delta} \int_0^{\Delta} (\pi_A D_1 r_A^k r_B^k + D_2 r_B^k) dk +$$

$$\pi_B r_B^{-\Delta} \int_{\Delta}^{K} (\pi_A D_1 r_A^k r_B^k + D_2 r_B^k) dk$$

where $D_1 = D_0 - D_A - D_B + D_T$ and $D_2 = D_B - D_T$.

Differentiate D with respect to $\Delta$ and set equal to zero to find an extremum.

$$\frac{\partial D}{\partial \Delta} = \frac{\partial}{\partial \Delta} \left\{ \pi_B r_B^{K-\Delta} \int_0^{\Delta} (\pi_A D_1 r_A^k r_B^k + D_2 r_B^k) dk \right\} +$$

$$\frac{\partial}{\partial \Delta} \left\{ \pi_B r_B^{-\Delta} \int_{\Delta}^K (\pi_A D_1 r_A^k r_B^k + D_2 r_B^k) dk \right\} =$$

$$-\pi_B r_B^{K-\Delta} \ln(r_B) \int_0^{\Delta} (\pi_A D_1 r_A^k r_B^k + D_2 r_B^k) dk +$$

$$\pi_B r_B^{K-\Delta} (\pi_A D_1 r_A^{\Delta} r_B^{\Delta} + D_2 r_B^{\Delta}) -$$

$$\pi_B r_B^{-\Delta} \ln(r_B) \int_{\Delta}^K (\pi_A D_1 r_A^k r_B^k + D_2 r_B^k) dk -$$

$$\pi_B r_B^{-\Delta} (\pi_A D_1 r_A^{\Delta} r_B^{\Delta} + D_2 r_B^{\Delta}) = \pi_B r_B^{-D} \left( (\pi_B D_1 r_A^{\Delta} r_B^{\Delta} + D_2 r_B^{\Delta})(r_B^K - 1) - \right.$$

$$\ln(r_B) \left( r_B^K \int_0^{\Delta} (\pi_A D_1 r_A^k r_B^k + D_2 r_B^k) dk + \right.$$

$$\left. \left. \int_{\Delta}^K (\pi_A D_1 r_A^k r_B^k + D_2 r_B^k) dk \right) \right) = 0$$

Using that $\int a^x dx = a^x \ln^{-1}(a) + C$ and the notation $$R = \frac{\ln(r_B)}{\ln(r_A) + \ln(r_B)},$$

the extremum in the following equation.

$$0 = r_A^{\Delta} r_B^{\Delta} \{\pi_A D_1 (r_B^K - 1 - R r_B^K + R)\} + D_1 \pi_A R(1 - r_A^K) r_B^K$$

$$= r_A^{\Delta} r_B^{\Delta} \{r_B^K - 1 - R r_B^K + R\} + R(1 - r_A^K) r_B^K$$

$$= \gamma r_A^{\Delta} r_B^{\Delta} + \alpha,$$

where $\gamma \equiv r_B^K - 1 - R r_B^K + R$ and $$\alpha \equiv R(1 - r_A^K) r_B^K.$$

Hence, the displacement is given by $$\Delta = \frac{\ln(-\alpha/\gamma)}{\ln(r_A + \ln(r_B))}$$

and is dependent only on $r_A$ and $r_B$, i.e., the probabilities that the transmission in the channels will remain error free if the previous transmission was error free.

Since the range of $\Delta$ is bounded, the minimum of D for $\Delta \in [0,K)$ is given by the minimum of $D(\Delta=0)$ and $$D\left(\Delta = \frac{\ln(-\alpha/\gamma)}{\ln(r_A) + \ln(r_B)}\right).$$

The solution for the discrete problem that we started with is the displacement $\Delta$ that gives the minimum value of $D(\Delta=0)$, $$D\left(\Delta = \left\lfloor \frac{\ln(-\alpha/\gamma)}{\ln(r_A) + \ln(r_B)} \right\rfloor\right),$$

$$D\left(\Delta = \left\lceil \frac{\ln(-\alpha/\gamma)}{\ln(r_A) + \ln(r_B)} \right\rceil\right)$$

and $D(\Delta=K-1)$. The brackets $\lfloor \cdot \rfloor$ and $\lceil \cdot \rceil$ denote the floor and ceil operations, respectively.

It should be noted that the detailed description above of different embodiments of the invention has been given by way of illustration only and that these therefore are not intended to limit the scope of the invention, as it is defined by the appended claims. Furthermore, it will be appreciated that various alterations and modifications falling within the scope of the appended claims will become apparent to those skilled in the art when studying the claims and the detailed description.

What is claimed is:

1. A method comprising:
   encoding, by a processor of an encoder in response to instructions stored on a non-transitory computer readable medium, a plurality of input frames from an input video sequence, wherein the plurality of input frames includes a first input frame, wherein encoding the plurality of input frames includes:
   encoding the first input frame as a first encoded I-frame;
   encoding the first input frame as a first encoded P-frame independently and concurrently with encoding the first input frame as the first encoded I-frame;
   determining I-frame placement based on minimizing expected distortion at a decoder;
   generating a first plurality of encoded frames based on the plurality of input frames such that the first plurality of encoded frames includes the first encoded I-frame corresponding to the first input frame, and
   generating a second plurality of encoded frames based on the plurality of input frames such that the second plurality of encoded frames includes the first encoded P-frame corresponding to the first input frame;
   including the first plurality of encoded frames and the second plurality of encoded frames in an output; and
   transmitting the output to the decoder,
   wherein determining the I-frame placement includes determining whether to generate the first plurality of encoded frames such that the first plurality of encoded frames includes the first encoded I-frame, and generate the second plurality of encoded frames such that the second plurality of encoded frames includes the first encoded P-frame.

2. The method of claim 1, wherein transmitting the output to the decoder includes transmitting the output to the decoder via a wireless electronic communication medium.

3. The method of claim 1, wherein minimizing expected distortion at the decoder is based on an identified network characteristic for transmitting the output to the decoder.

4. The method of claim 3, wherein the identified network characteristic is an identified transmission error probability for transmitting the output to the decoder.

5. The method of claim 1, wherein the plurality of input frames includes a second input frame subsequent to the first input frame, and wherein encoding the plurality of input frames includes:
   generating the first plurality of encoded frames such that the first plurality of encoded frames includes a second encoded P-frame corresponding to the second input frame; and
   generating the second plurality of encoded frames such that the second plurality of encoded frames includes a second encoded I-frame corresponding to the first input frame.

6. The method of claim 5, wherein determining the I-frame placement includes identifying the second input frame such that a temporal distance between the first input frame and the second input frame is an identified temporal distance, wherein the temporal distance indicates a cardinality of a set of frames from the plurality of input frames temporally between the first input frame and the second input frame in the input video sequence.

7. The method of claim 6, wherein determining the I-frame placement includes determining, by the processor of the encoder, the identified temporal distance based on minimizing expected distortion at the decoder.

8. The method of claim 7, wherein minimizing expected distortion at the decoder is based on an identified network characteristic for transmitting the output to the decoder.

9. The method of claim 8, wherein the identified network characteristic is an identified transmission error probability for transmitting the output to the decoder.

10. A method comprising:
    encoding, by a processor of an encoder in response to instructions stored on a non-transitory computer readable medium, a plurality of input frames from an input video sequence, wherein the plurality of input frames includes a first input frame and a second input frame subsequent to the first input frame, wherein encoding the plurality of input frames includes:
    identifying the second input frame such that a temporal distance between the first input frame and the second input frame is an identified temporal distance, wherein the temporal distance indicates a cardinality of a set of frames from the plurality of input frames temporally between the first input frame and the second input frame in the input video sequence;
    encoding the first input frame as a first encoded I-frame;
    encoding the second input frame as a first encoded P-frame;
    encoding the second input frame as a second encoded I-frame independently and concurrently with encoding the second input frame as the first encoded P-frame;

encoding the first input frame as a second encoded P-frame independently and concurrently with encoding the first input frame as the first encoded I-frame;

generating a first plurality of encoded frames based on the plurality of input frames such that the first plurality of encoded frames includes the first encoded I-frame corresponding to the first input frame and the first encoded P-frame corresponding to the second input frame; and generating a second plurality of encoded frames based on the plurality of input frames such that the second plurality of encoded frames includes the second encoded P-frame corresponding to the first input frame and the second encoded I-frame corresponding to the first input frame;

including the first plurality of encoded frames and the second plurality of encoded frames in an output; and transmitting the output to a decoder.

11. The method of claim 10, wherein transmitting the output to the decoder includes transmitting the output to the decoder via a wireless electronic communication medium.

12. The method of claim 10, wherein encoding the plurality of input frames includes determining, by the processor of the encoder, the identified temporal distance based on minimizing expected distortion at the decoder.

13. The method of claim 12, wherein minimizing expected distortion at the decoder is based on an identified network characteristic for transmitting the output to the decoder.

14. The method of claim 13, wherein the identified network characteristic is an identified transmission error probability for transmitting the output to the decoder.

15. A method comprising:
  encoding, by a processor of an encoder in response to instructions stored on a non-transitory computer readable medium, a plurality of input frames from an input video sequence, wherein encoding the plurality of input frames includes:
    for each input frame from the plurality of input frames:
      in response to a determination to encode the input frame as a first I-frame and include the first I-frame in a first plurality of encoded frames:
        encoding the input frame as the first I-frame,
        including the first I-frame in the first plurality of encoded frames,
        encoding the input frame as a first P-frame, wherein encoding the input frame as the first P-frame includes encoding the input frame as the first P-frame independently of and concurrently with encoding the input frame as the first I-frame, and
        including the first P-frame in a second plurality of encoded frames; and
      in response to a determination to encode the input frame as a second P-frame and include the second P-frame in the first plurality of encoded frames:
        encoding the input frame as the second P-frame,
        including the second P-frame in the first plurality of encoded frames,
      in response to a determination to encode the input frame as a second I-frame and include the second I-frame in the second plurality of encoded frames:
        encoding the input frame as the second I-frame, wherein encoding the input frame as the second I-frame includes encoding the input frame as the second I-frame independently of and concurrently with encoding the input frame as the second P-frame; and
        including the second I-frame in the second plurality of encoded frames, and
      in response to a determination to encode the input frame as a third P-frame and include the third P-frame in the second plurality of encoded frames:
        encoding the input frame as the third P-frame, wherein encoding the input frame as the third P-frame includes encoding the input frame as the third P-frame independently of and concurrently with encoding the input frame as the second P-frame; and
        including the third P-frame in the second plurality of encoded frames, and
  including the first plurality of encoded frames and the second plurality of encoded frames in an output; and
  transmitting the output to a decoder.

* * * * *